M. Fleck.
Extension Table.
Nº 99,075.      Patented Jan. 25, 1870.
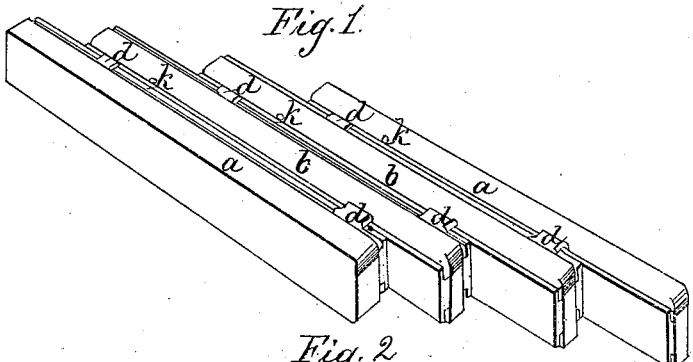
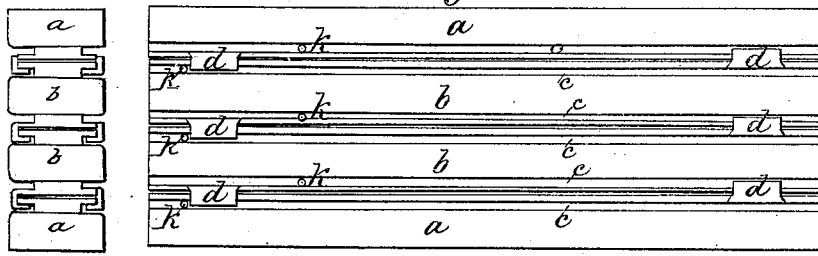
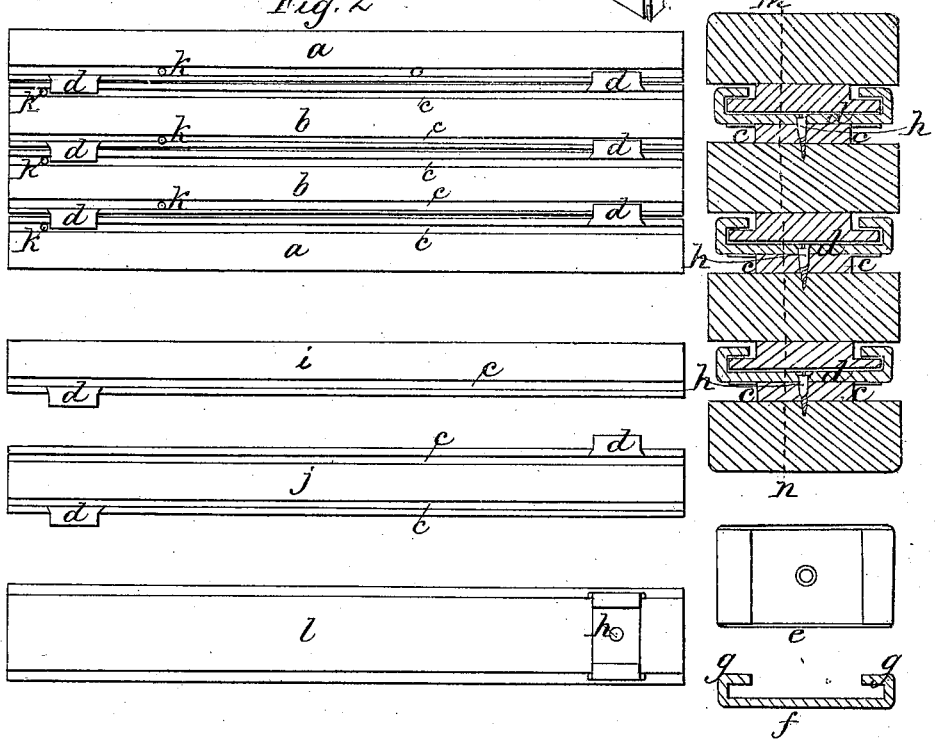
Witnesses
C. Boch
N. Horror
Inventor
Michael Fleck

United States Patent Office.

MICHAEL FLECK, OF MILWAUKEE, WISCONSIN.

Letters Patent No. 99,075, dated January 25, 1870.

IMPROVED EXTENSION-TABLE SLIDE.

The Schedule referred to in these Letters Patent and making part of the same.

To all whom it may concern:

Be it known that I, MICHAEL FLECK, of Milwaukee, and State of Wisconsin, have invented a new and useful Improvement for Extension-Furniture Slides; and I do hereby declare that the following is a full, clear, and exact description of the construction and operation of the same, reference being had to the annexed drawings, making a part of this specification, in which—

Figure 1 is a perspective view, showing the slide partly extended.

Figure 2 shows the upper side of the slide when closed.

Figure 3 is a sectional view, showing the ends of the guide-bars, with their grooves, the metal guide, and screws, in red dotted line, from $n$ to $m$.

This invention consists in a novel construction for furniture-slides, whereby the same may be cheaply and conveniently manufactured, and rendered effective in application to furniture, where extension is desired.

To enable others to understand the nature and construction of my invention, I will proceed to describe it with reference to the drawings.

$a\ a$ represent parallel guide-bars, of the length and width desired, with grooves $c\ c$ on their upper and lower edges, on the inside of the outside bars.

$b\ b$ represent the inner parallel guide-bars, of equal length and width of the outside bars, with grooves $c\ c$ on the upper and lower edges, and on each of the sides.

The grooves are used for the alternating motion of the metallic guides $d\ d$, the hook-part, $g$, of which slides in the grooves $c$ of the guide-bars $a$, allowing for the extending and contracting movement as desired.

It will be seen that the guides $d$, composed of the hooks $g$, which take into both the upper and under grooves $c$, of the bars $a\ b$, and the connecting-plates $f$, are constructed in one piece, thereby insuring, by the continuity of material, increased strength, and a more ready adjustment in fitting to place.

E is the face of the metallic guide, showing the hook $g$. One metallic guide is placed at or near the ends of the guide-bars, and on each alternate side.

$f$ is the side of the metallic guide, showing the hook-part $g$, which slides on the grooves of the guide-bar.

$h$ is a screw, one or more in number, securing the metal guide in place.

$i$ is the outside guide-bar, detached, showing the grooves $c$ on the upper and lower edges on the inner side.

$j$ is the middle guide-bar, detached, showing the grooves on the upper and lower edges, and on each of the sides.

$l$ is the inner face of the outside guide-bar, and showing position of metal guide.

$k$ are stops or pins, driven in the groove of the guide-bar, preventing the metal guides from being drawn out from the grooves as the guide-bars are being extended.

Thus, by this simple arrangement, it will be seen that any furniture, where extension is desired, may be extended or contracted with facility and safety.

What I claim, and desire to secure by Letters Patent, is—

The extension and guide-bars $a\ b$, with their grooves $c$, in combination with the metallic guides $d$, when constructed in one piece, to slide in both the upper and under grooves $c$, substantially as and for the purpose set forth.

MICHAEL FLECK.

Witnesses:
 HENRY C. KOCH,
 WILLIAM M. HORNOR.